(12) United States Patent
Massey et al.

(10) Patent No.: US 8,981,919 B2
(45) Date of Patent: Mar. 17, 2015

(54) WIRELESS PROPORTIONAL FLOW INDICATION FOR A TIRE INFLATION SYSTEM

(71) Applicant: Stemco LP, Longview, TX (US)

(72) Inventors: Michael James Massey, Longview, TX (US); Mark J. Kranz, Longview, TX (US); Mark N. Gold, Longview, TX (US); James C. Steph, Longview, TX (US); Herman Goins, Jr., Longview, TX (US)

(73) Assignee: Stemco LP, Longview, TX (US)

( * ) Notice: Subject to any disclaimer, the term of this patent is extended or adjusted under 35 U.S.C. 154(b) by 130 days.

(21) Appl. No.: 13/760,678

(22) Filed: Feb. 6, 2013

(65) Prior Publication Data

US 2013/0335214 A1    Dec. 19, 2013

Related U.S. Application Data

(60) Provisional application No. 61/595,918, filed on Feb. 7, 2012.

(51) Int. Cl.
*B60C 23/02* (2006.01)
*B60C 23/00* (2006.01)
*B60C 23/04* (2006.01)

(52) U.S. Cl.
CPC .............. *B60C 23/00* (2013.01); *B60C 23/003* (2013.01); *B60C 23/009* (2013.01); *B60C 23/0408* (2013.01)
USPC .......... 340/442; 340/447; 340/449; 73/146.5; 116/34 R

(58) Field of Classification Search
CPC .. B60C 23/00; B60C 23/0408; B60C 23/009; B60C 23/003
USPC ........... 340/442–449; 73/146.2, 146.3–146.5, 73/146; 137/225, 226; 116/34 R, 34 A, 116/34 B; 152/152.1, 151, 415
See application file for complete search history.

(56) References Cited

U.S. PATENT DOCUMENTS

| | | | |
|---|---|---|---|
| 5,880,378 A * | 3/1999 | Behring, II | 73/861.53 |
| 6,894,607 B1 * | 5/2005 | Claussen et al. | 340/442 |
| 7,201,066 B1 | 4/2007 | Stone et al. | |
| 7,760,079 B2 * | 7/2010 | Isono | 340/442 |
| 8,201,575 B2 | 6/2012 | Anderson et al. | |
| 2009/0096599 A1 * | 4/2009 | Kranz | 340/459 |

* cited by examiner

*Primary Examiner* — Anh V La
(74) *Attorney, Agent, or Firm* — Perkins Coie LLP

(57) ABSTRACT

A flow indication system for a central tire inflation system is provided. The flow indication system provides a venturi in fluid communication with the conduit providing air to a tire. A pressure reading is taken at the inlet and throat of the venturi and the air flowing through the venturi is calculated based on the pressure differential. According to some embodiments, the pressure readings are provided to a microcontroller that uses a table and interpolation algorithms to calculate the flow of the air flowing through the venturi, such as the mass of air in a given unit of time (grams/second for example). In one embodiment, two separate pressure sensors are coupled to different ends of a narrowed orifice that causes a pressure change in the flow as flow rate increases in the throat of the sensor. This pressure change is then used to calculate a proportional flow that can then be broadcast to various parties instead of an on/off reading.

18 Claims, 3 Drawing Sheets

WIRELESS PROPORTIONAL FLOW INDICATION FOR A TIRE INFLATION SYSTEM

RELATED APPLICATION

The technology of the present application claims priority to U.S. Provisional Patent Application Ser. No. 61/595,918, filed Feb. 7, 2012, titled Wireless Proportional Flow for a Tire Inflation System, the disclosure of which is incorporated herein by reference as if set out in full.

FIELD

The technology of the present application relates to central tire inflation systems used to maintain tire pressure of a vehicle in operation. More specifically, the technology of the present application provides a wireless proportional flow indication for a central tire inflation system so an operator obtains actual flow information.

BACKGROUND

Vehicle safety and efficiency are concerns for any vehicle operator. Safety is important for the operator of a vehicle, for the passengers in the vehicle, and for others that share the road with the vehicle. Safe vehicle operation also may reduce vehicle repair costs and downtime. Efficiency also is important for the vehicle operator and the vehicle owner. Efficient vehicle operation may reduce operating and maintenance costs associated with a vehicle, thereby improving profit margins for a business that operates vehicles or possibly saving on maintenance, fuel, and administrative costs. Components that contribute to both vehicle safety and efficiency include axle components and drive train components. Axle components include wheels, wheel hubs, pneumatic tires, suspension components, braking components, and the like. Drive train components include a vehicle engine and components that transfer power from the engine to the drive wheels of the vehicle.

Proper maintenance of the vehicle is important to safe and efficient operation of the vehicle. Proper maintenance includes proper lubricant fluid levels, proper replacement of fluids, proper tire pressures, and the like. In the case of a pneumatic tire, for example, improper air pressure in the tire can lead to an increased likelihood of a failure of the tire due to increased heating and/or increased or uneven tread wear. Improper air pressure also can increase costs associated with operating the vehicle due to reduced life of the tire, thereby increasing replacement costs, and also increased rolling friction, thereby reducing fuel economy.

Accordingly, one important aspect of operating any vehicle is the proper maintenance of the vehicle. Proper maintenance facilitates optimal vehicle performance. In the case of an entity that operates a number of different vehicles, such as a trucking company, a rental car company, a delivery company, maintenance of fleet vehicles is particularly important. Proper maintenance helps ensure that costs associated with vehicle operation are not unnecessarily increased. However, maintenance has its own associated cost. The costs of proper maintenance include vehicle "downtime." However, operating schedules of the entity may inhibit properly maintaining the vehicles. In other words, the volume of maintenance checks and the time required to perform such checks may result in vehicle maintenance being performed less often than is ideal as the vehicle is committed to jobs and tasks. Moreover, too much maintenance is an unwarranted expense.

The value of maintenance checks to confirm proper vehicle conditions offset some of the benefits of properly maintaining vehicles due to the costs associated with performing such checks as well as the vehicle downtime. Furthermore, when a vehicle is on the road, access to a suitable maintenance facility may be limited.

Various systems have been designed and are the subject of numerous patents that accomplish the objective of maintaining tire pressure within an acceptable range. These systems are typically called central tire inflation systems (CTIS). The most common systems in the heavy truck industry are designed for trailers. Trailer axles are typically hollow with axle ends that commonly have a through bore. The hollow axle provides a conduit to supply air pressure to the wheel end. The wheel end assembly includes a lubrication area between the axle and the wheel further defined by plugging the through bore in the axle end and covering the end of the axle with a hub cap attached to the wheel. The wheel is supported on the axle end by wheel bearings. The bearings require lubrication and the integrity of the lubrication area is essential in maintaining the operability and life of the wheel end assembly. In order to provide pressurized air to the rotating tires, the CTIS typically includes a rotary union assembly in the same general location as the bearings. The rotary union assembly is in or adjacent to the lubrication area between the stationary axle and the wheel.

Many tire inflation systems also provide an indication that air is flowing to one or more tires. Conventionally, CTIS provide a "go/no-go" or "flow/no-flow" indication that air is flowing through the system. These systems generally include a rubber diaphragm contained within the air flow conduit or hose. The diaphragm is provided with a bore to allow air to pass across the diaphragm to pressurize the system. As air travels in the system, the diaphragm moves in response to the air flow. The movement of the diaphragm in response to air flow closes an electrical circuit. The closed electrical circuit provides power to an indicator, such as a light, that indicates air is flowing through the system somewhere. Such a conventional system is described in U.S. Pat. No. 8,201,575, issued Jun. 19, 2012, titled Air Pressure Regulator with Flow Sensor, the disclosure of which is incorporated herein as if set out in full.

The indication may alert an operator or driver that there is a leak in one or more tires, or perhaps a leak in the tire inflation system. In any event, the presence of such a leak is an indication that the vehicle should be serviced to correct the problem. Traditional systems commonly rely on very simplistic flow switches, as described in the aforementioned U.S. Pat. No. 8,201,575, that use a differential pressure to close a mechanical switch. Traditionally, these systems require a wiring harness from the sensor to the indicator light, which adds to the installation costs. Conventionally, the only information provided is whether air is flowing. That air is flowing is typically provided by a light being illuminated in the nose of the trailer that a driver must identify via the rearview mirror. A driver must notice the illumination of a light behind the tractor cab on the nose of the trailer to even be alerted that a problem exists in the system. Also, the system only warns when flow exists, but it does not provide an indication of which wheel, which is problematic on larger vehicles, nor does it provide information regarding whether the flow relates to regular variations in tire pressure or is indicative of a problem or failure.

Another type of flow sensor for a CTIS is disclosed by U.S. Pat. No. 7,201,066, issued Apr. 10, 2007, titled System for Automatic Tire Inflation, the disclosure of which is incorporated herein as if set out in full. The '066 patent provides another mechanical sensor for gas flow to inflate the downstream tires. The '066 patent measures a pressure drop across a porous media element where there is a linear relationship between the pressure drop across the media and the flow rate of the gas through the meter.

As can be appreciated, conventional systems employ mechanical systems to measure pressure and/or differential pressure to determine whether flow exists in a system. These systems provide crude accuracy at best. Because of the crude measuring, most conventional CTIS provide an indication of flow only when air flow in the CTIS exceeds about 1.2 cubic feet per minute, which is essentially indicative of a tire blowout or a tube breakage.

The above and other mechanical system to indicate flow of air in the CTIS leave much to be desired. Thus, against this background it would be desirous to provide an indication to the vehicle operator of the actual flow rate of air through the system. Moreover, it would be desirous to provide information relating to which of the plurality of tire the air is flowing. Additionally, it would be desirous to provide a system that also provides a warning as well as an alarm to a vehicle operator based on various parameters associated with the CTIS. Finally, it would be desirous to provide a system that provides an indication of flow prior to a catastrophic failure, such as a blowout.

SUMMARY

Methods, systems, and devices are described for an integrated monitoring system and pressure maintenance system. Air flow in such a system is determined through the creation of a venturi with an inlet port and an exit port and a pressure sensor at the inlet and throat. A pressure reading is taken on the inlet and outlet ports and flow of the air flowing through the venturi is calculated based on the pressure differential. According to some embodiments, inlet and exit pressure readings are provided to a microcontroller that uses a table and interpolation algorithms to calculate the flow of the air flowing through the venturi, such as the mass of air in a given unit of time (grams/second for example). In one embodiment, two separate pressure sensors are coupled to different ends of a narrowed orifice that causes a pressure change in the flow as flow rate increases in the throat of the sensor. This pressure change is then used to calculate a proportional flow that can then be broadcast to various parties instead of an on/off reading. In some embodiments, the microcontroller then broadcasts this flow value to a remote indicator, display, or system. The microcontroller may broadcast over a wireless link. The wireless link may be a direct sequence spread spectrum (DSSS) wireless link to, for example, a light on the nose of the trailer or into a cab of the vehicle. Such information may provide an operator with information that air flow is present in the system. In the event that air flow is continually present, or present more often than usual, the operator may determine that a problem exists with respect to one or more tires and take appropriate corrective action. According to various aspects, the present disclosure provides a flow indication system that is:

1. battery operated so that a wiring harness does not have to be run back from the light on the nose of the trailer;
2. configured to provide proportional flow measurement rather than just an on/off indication of flow;
3. wirelessly capable of sending flow indication to other readers including ones in a vehicle cab or to an indicator light on the trailer;
4. capable to provide information related to individual wheel end indication;
5. configured to provide a proportional indication display rather than just an on/off light on the trailer, enabling an operator to determine the magnitude of a leak;
6. capable of being programmed with one or more warning thresholds;
7. configured to provide enhanced flow sensitivity;
8. capable to bring the information to the driver in the cab where an audible or visual warning can be given in front of the driver if needed.

Of course, various embodiments may omit, substitute, or add various procedures or components as appropriate. For instance, aspects and elements described with respect to certain embodiments may be combined in various other embodiments. It should also be appreciated that the described systems, methods, and devices may individually or collectively be components of a larger system, wherein other procedures may take precedence over or otherwise modify their application.

BRIEF DESCRIPTION OF THE DRAWINGS

The technology of the present application will be further explained with reference to the drawing figures referenced below, wherein like structures may be referred to by like numerals throughout the several views thereof.

While the above-identified drawing figures set forth one exemplary embodiment, other embodiments of the present invention are also contemplated, as noted throughout. The technology of the present application is described by way of representative examples and should not be construed as limiting. Numerous other modifications and embodiments within the spirit and scope of the technology of the present application are incorporated herein.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Figure 1:
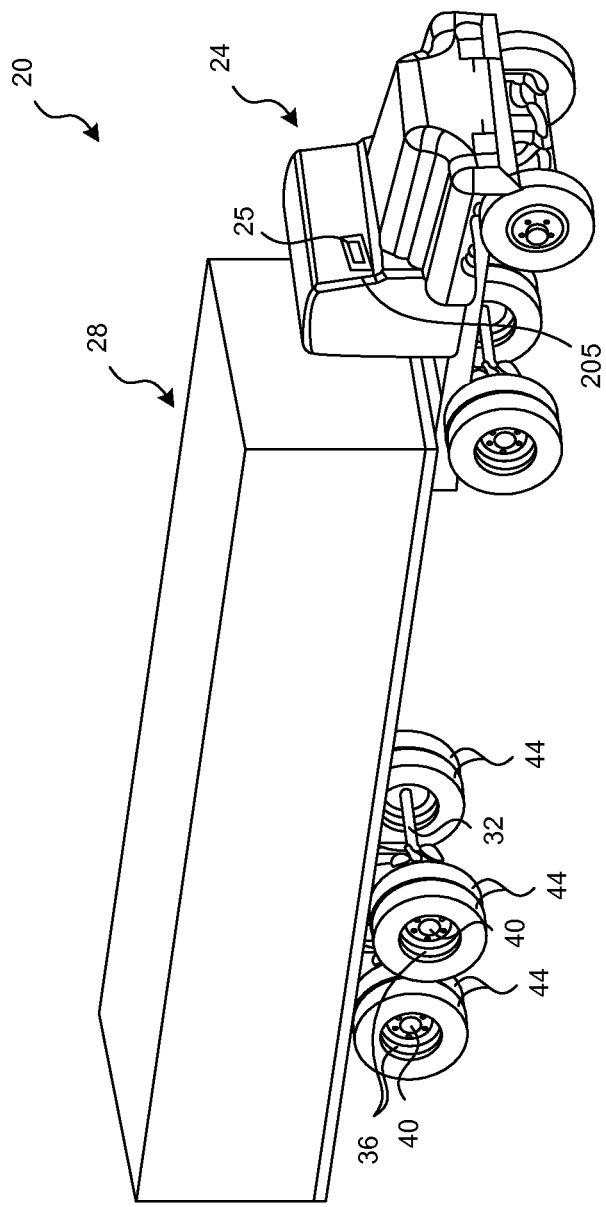
FIG. 1 is a perspective view of a vehicle using the technology of the present application.

With reference to FIG. 1, an application of an exemplary embodiment is described with respect to a truck 20 having a tractor 24 and trailer 28. The trailer 28 is illustrated in FIG. 1 includes two axles 32, each of which having dual wheels 36 on each side, which is typically in larger, heavy duty trailers. Each set of dual wheels 36 may also be referred to as a wheel end. As will be readily apparent to one skilled in the art, trailer 28 could be a single axle trailer, and axles may have single versus dual wheels. Moreover, the technology described herein couple be applied on other vehicles including, for example, conventional two axle vehicles. The trailer 28 includes a pressure system, not shown but generally known in the art, that operates to maintain tires 44 at each wheel end within a preset pressure range. Each set of dual wheels 36, in this embodiment, includes a connection to a flow sensor unit 40 that is interconnected with each tire 44 on each set of dual wheels 36. In other words, each tire 44 may have a sensor 50 connected to a common flow sensor unit 40 or each tire may have a sensor 50 connected to a dedicated flow sensor unit 40. The tire 44 may be referred to as a pneumatic tire as the tires 44 are filled with a fluid (gas) and not a solid rubber tire. An exemplary sensor 50 and flow sensor unit 40 will be described in further detail for an exemplary embodiment with respect to FIG. 2. The flow sensor unit 40, in some embodiments, detects the tire pressure for each of the tires 44. The flow sensor unit 40 also may detect both the fact of air flow to a specific tire as well as the pressure differentials such that the mass flow rate of the air to the specific tire may be calculated and displayed and/or used to provide indication, warnings, or alarms to the vehicle operator.

The flow sensor unit 40 also may include a radio frequency transceiver that receives and transmits radio frequency signals that include information including the sensed flow of air for each of the tires 44 and/or wheel ends 36 to which the flow sensor unit 40 is connected. The trailer 28 may include additional flow sensor units 40, or other sensors. Examples of other sensors include sensors that monitor tire pressure, monitor the lubricant within wheel hubs, hobodometers that monitor the distance the vehicle has traveled, weight sensors, asset or vehicle identification sensors, and brake fluid sensors, to name a few. Furthermore, it will be understood that the devices, systems, and methods described herein are applicable to vehicles other than heavy trucks, such as passenger vehicles, rail vehicles, marine vessels, aircraft, and any other device where air or fluid flow in a part of the vehicle is desired to be monitored.

Within the tractor 24, in this embodiment, is a monitor 25, which may include a display 205. The monitor 25 may receive information from flow sensor unit 40. The monitor 25 detects and is operably connected to the flow sensor unit(s) 40 that are associated with the trailer 28. Operably connected means the monitor is connected to flow sensor unit 40 through a wireless or wired connection. The monitor 25 receives information from flow sensor unit(s) 40 through the connection. The monitor 25 may generate an alarm if any of the flow sensor unit(s) 40 transmit an RF signal that includes information indicative of a sensed flow parameter that is out-of-limit, which may be called a warning signal or an alarm signal. Notice that the trailer 28 may have a flow sensor unit 40 that receives multiple inputs for tires through multiple sensors 50, which include a manifold as exampled further below. Alternatively, the system may have multiple flow sensor units 40 that receive input from one sensor 50 in fluid communication with one tire, or a combination thereof. In many instances, the tractor 24 may be attached to one of a number of different trailers 28. Such a situation is common in fleet operations where a plurality of trailers 28 may be connected to a plurality of tractors 24. Thus, wireless transmission of information from sensors 40 provides enhanced efficiency by allowing communication of information without the requirement of additional wiring connections between a tractor 24 and trailer 28.

Figure 2:
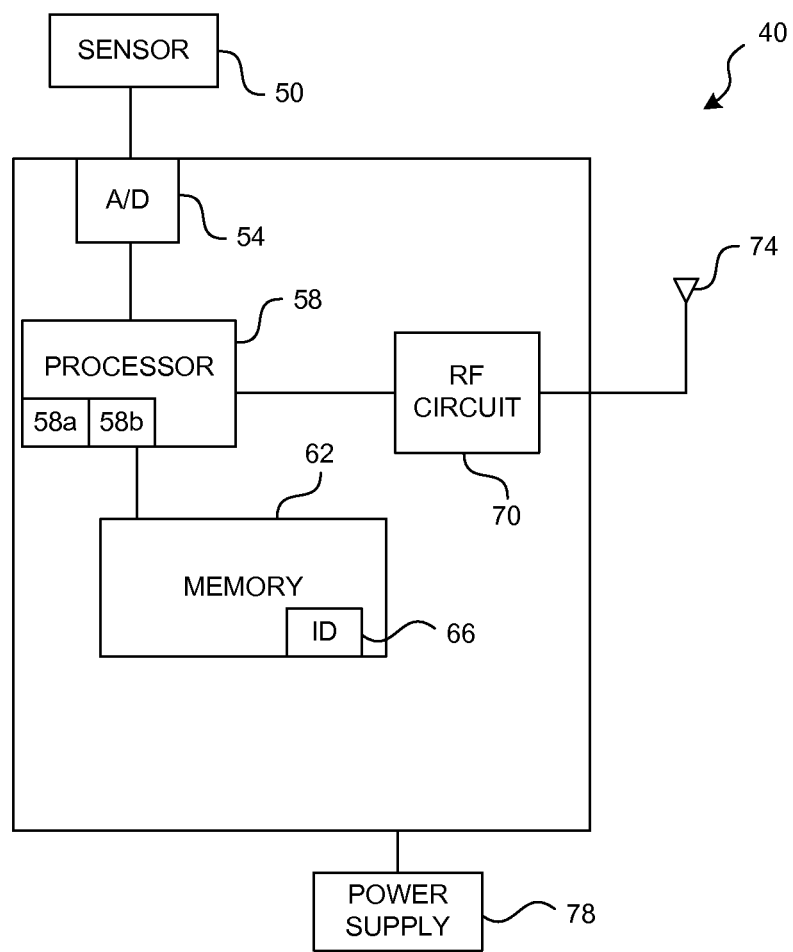
FIG. 2 is a functional block diagram of a flow sensor unit and flow sensor consistent associated with the vehicle of FIG. 1.

A block diagram illustration of a flow sensor unit 40, for an exemplary embodiment, is illustrated in FIG. 2. In this embodiment, a flow sensor 50 is connected through an analog-to-digital (A/D) converter 54 to a processor 58. Processor and microcontroller are used generally interchangeably herein. The processor 58 may contain a calculator 58a or a comparator 58b as explained further below. The flow sensor 50 may be coupled to a CTIS that provides compressed air to each wheel end. The flow sensor unit 40, in the embodiment of FIG. 2, includes a flow sensor 50 for each wheel end, which is calibrated to provide an output that corresponds to the rate air is flowing to the wheel end and not simply that air is flowing. The flow sensor 50 will be described in further detail below, with respect to FIG. 3. The output from the flow sensor 50 is provided to the A/D converter 54, where the output is converted to a digital signal that is provided to the processor 58. The flow sensor 50, in some embodiments, may pre-process the flow information to a digital signal such that A/D converter 54 is not necessary or is contained in the flow sensor 50. The processor 58 is interconnected with a memory 62, which may include operating instructions for the processor 58, and information related to the flow sensor 50, such as high/low sensor output limits, alarm thresholds, warning thresholds, duration of flow thresholds, information related to sensor calibration, and a unique identification 66 for the flow sensor unit 40. The processor 58 is interconnected also with an RF circuit 70, which transmits and receives RF signals through antenna 74. A power supply 78 provides power to each of the components of the flow sensor unit 40, and in one embodiment, is a battery that is included within a housing of the flow sensor unit 40. The power supply 78 also may include a replaceable power source, and/or rechargeable power source. The power supply 78, in certain embodiments, may be operably connected to the electrical system of the tractor 24. The RF circuit 70 of the flow sensor unit 40, in an embodiment, is an active transponder that receives an interrogation signal, and in response thereto, transmits a response signal that includes the flow sensor unit 40's unique identification 66, and information related to the current output of the flow sensor 50. The RF circuit 70, in some embodiments, may include a passive transponder that uses inductive coupling between an interrogator and the RF circuit to power the flow sensor unit 40 and transmit the information to the interrogator. In some passive transponder embodiments, a power supply 78 may be eliminated. RF circuit 70 may be a single transceiver circuit, or the RF circuit 70 may comprise separate transmit and receive circuits.

Figure 3:
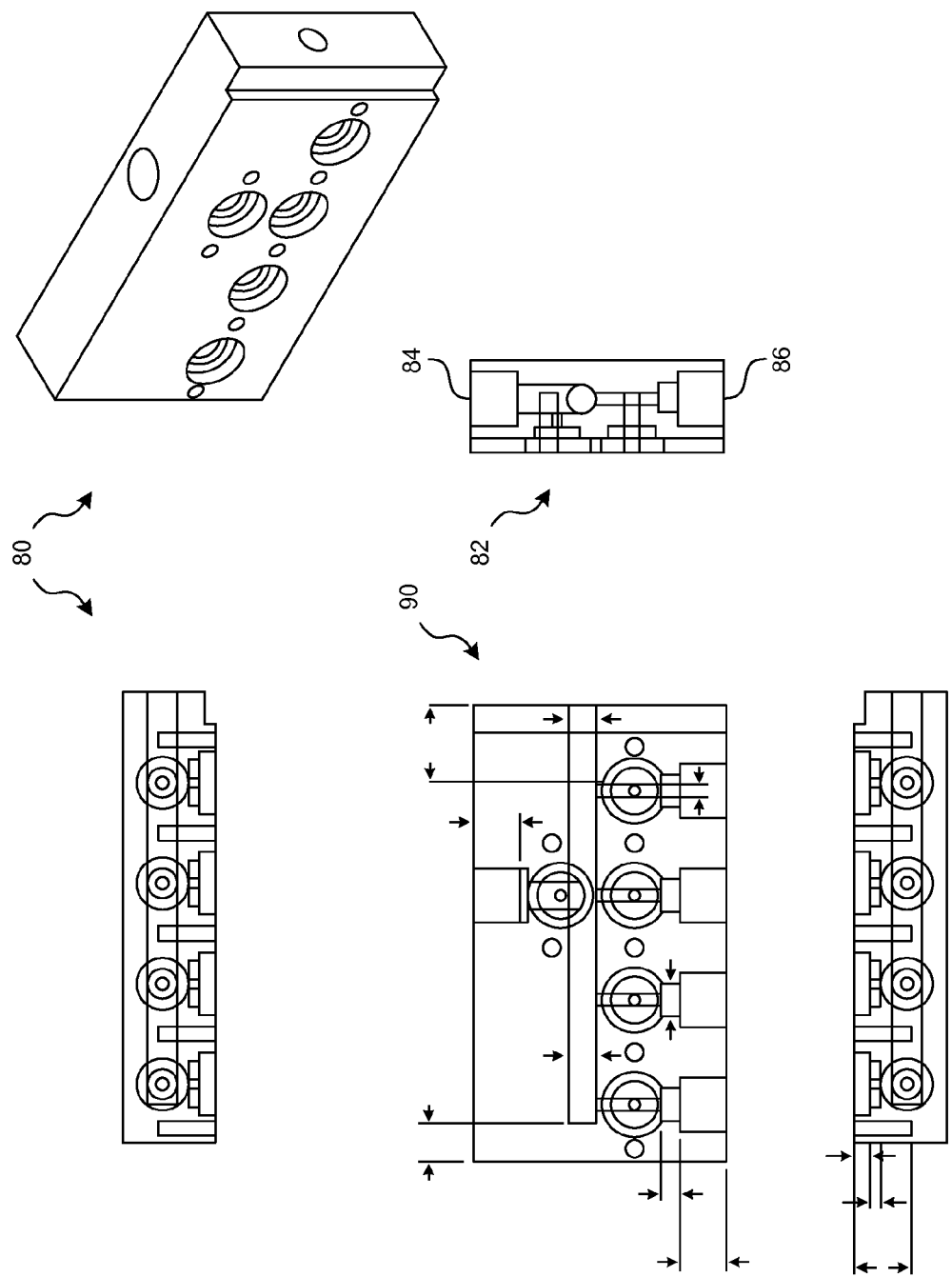
FIG. 3 is schematic of a manifold consistent with the technology of the present application.

With reference now to FIG. 3, a manifold 80 for a flow sensor 50, according to an embodiment, is illustrated. Such a manifold may be used to create one or a plurality of venturis 82 with, according to one embodiment, a throat 88 having a throat size, such as 0.055 inches in one exemplary embodiment, with an entry and exit port 84, 86 with a size of 0.170 inches. As is generally know, a venturi throat 88 has a reduced diameter as compared to the entry port, etc. At least two pressure sensors 90, such as, for example, two strain gauge absolute pressure sensors, are coupled to the venturi 82, with one at the entry port 86 and one at the throat 88; the outputs of which are provided to differential amplifiers to extract pressure information. The resulting outputs are provided to another set of differential pressure amplifiers. The output of the second set of amplifiers is connected to the A/D port 54 on the flow sensor unit 40 along with the actual pressure outputs of the first amplifier stage. The microcontroller of the flow sensor digitizes the pressures and the amplified differential pressures. The microcontroller, which may include the calculator 58a, uses the information and, based on the pressure readings, a compensation table is loaded to correct for pressure and temperature nonlinearities. This table is then used to calculate the flow rate of the system based on the differential pressure using the Venturi Effect in combination with Bernoulli's equations as is generally know.

The processor 58, which may be a microcontroller, chip set or the like, according to an embodiment, then broadcasts this flow value over a wireless direct sequence spread spectrum 2.4 GHz wireless link to a receiver operatively coupled to the monitor 25. Such a receiver may include, for example, a light on the nose of the trailer or a receiver system in a cab of the vehicle. At the same time, a solid state relay contact is closed when the flow rate gets to a programmable threshold level, which may cause an alarm at the monitor 25, which alarm may be audio, visual or a combination thereof. The manifold 80 may be expanded by adding additional venturis and sensors on the outputs to a series of ports on the flow sensing manifold to allow for flow measurement on any wheel end or individual tire in the inflation system. The minimum number of sensors required is based on the number of output ports plus the inlet port. So on a four wheel end system, four output pressure sensors and one inlet pressure sensor would be used in one exemplary embodiment.

One particular exemplary embodiment for the processor is a MSP430 series processor to allow for low power consumption and a battery operated environment. The battery life may be designed to be longer than the life of the trailer or at least 7-8 years.

According to various embodiments, the processor 58, the receiver, or the monitor, may be programmed with flow thresholds and generate warnings in the event one or more thresholds are exceeded. For example, the amount of flow calculated by the calculator 58a of processor 58 may be significant enough and/or last for a long enough period to indicate a problem requiring immediate attention. In certain embodiments, for example, a mass flow rate of approximately 0.9 cubic feet per minute (CFM) may be determined to be a high flow rate such that an alarm is sounded where the operator/driver may hear or see the alarm, such as a red warning light. A high alarm may be indicative of a puncture or the like, which may indicate a tire needing replacement as soon as possible or a puncture in the tubing for the inflation system. In certain embodiments, for example, a mass flow rate of approximately 0.5 CFM may be indicative of a slow leak. A slow leak may not require immediate replacement of a tire, but a replacement or repair at the next scheduled stop where a tire can be changed. In some cases, the length of the flow may be indicative of a problem, such as a slow leak or the like. Thus, the microcontroller may monitor a time associated with a flow through the flow sensor. In certain embodiments, flow existing for over approximately 10 seconds may be considered non transitory and indicative of a problem, such as a leak. The calculator 58a may use a clock circuit or the like to determine the time or duration of flow. As can be appreciated, the above measurements relate to calculating mass flow rate. Other flow rates are within the spirit and scope of the present application. In particular, the flow sensor may include a pressure sensor to provide pressure. When combined with a temperature, from a temperature sensor, for example, the actual density of the air may be calculated such that a true flow rate can be determined. Using the flow rate, thresholds may be set for a total volume of air flowing into a particular tire may be indicative of, for example, an intermittent slow leak. Approximately, in the context above, generally means within a tolerance such as ±10%.

A comparator 58b may compare the flow, total flow, time of flow, or flow rate information calculated by calculator 58a and compares it to a threshold value, which may be stored in memory associated with the processor. For example, if a tire has been penetrated by a road hazard, the tire may have a leak that requires constant, or near constant, air flow through the inflation system. This constant air flow may exceed a threshold and a warning may be provided to the vehicle operator, who may take appropriate action. In other examples, an air line or other component of the inflation system may be damaged, resulting in uncontrolled release of pressurized air. A flow threshold may be programmed to provide a vehicle operator with an alarm in such an event.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

We claim:

1. A central tire inflation system for maintaining tire inflation on a vehicle, the central tire inflation system comprising:
a conduit forming a fluid flow path to place a vehicle air source in fluid communication with at least one vehicle tire;
a flow sensor in fluid communication with the conduit and the at least one vehicle tire, wherein the flow sensor comprises at least two pressure sensors;
a temperature sensor;
a mass flow sensor unit operably connected to the flow sensor and the temperature sensor, the mass flow sensor unit comprising:
a calculator, the calculator to receive at least one flow signal generated from the at least two pressure sensors of the flow sensor and at least one temperature signal from the temperature sensor, the calculator calculates a mass flow rate based on the at least one flow signal and the at least one temperature signal, the calculator outputs a mass flow rate signal;
a comparator, the comparator to receive the calculated mass flow rate from the calculator and compare the mass flow rate to a first flow rate threshold, wherein the comparator outputs an alarm signal when the mass flow rate violates the first flow rate threshold;
a transmitter, the transmitter to emit the mass flow rate signal and the alarm signal; and
a display, the display viewable by an operator and operably connected to the mass flow sensor unit, wherein the display receives the emitted flow rate signal and alarm signal and is configured to display the flow rate to alarm when the alarm signal is received.

2. The central tire inflation system of claim 1 wherein the conduit is in fluid flow with a plurality of tires and the flow sensor comprises a corresponding plurality of flow sensors wherein a single flow sensor of the corresponding plurality of flow sensors is in fluid communication with a single tire of the plurality of tires.

3. The central tire inflation system of claim 2 wherein the mass flow sensor unit is operably connected to each of the plurality of flow sensors and the calculator calculates a plurality of mass flow rate signals corresponding to each of the flow sensors and wherein the display displays the mass flow rate for each of the plurality of tires.

4. The central tire inflation system of claim 1 wherein the flow sensor is a venture comprising an inlet, an outlet, and a throat.

5. The central tire inflation system of claim 1 wherein the mass flow sensor unit is operably connected to the display via a radio frequency connection.

6. The central tire inflation system of claim 1 further comprising a power supply coupled to the mass flow sensor unit.

7. The central tire inflation system of claim 6 wherein the power supply is a battery.

8. The central tire inflation system of claim 6 wherein the power supply is an electrical system of the vehicle.

9. The central tire inflation system of claim 1 wherein the calculator further calculates a duration of flow of air to the at least one tire and the comparator compares the duration to a first time threshold and outputs the alarm signal when the first time threshold is violated.

10. A central tire inflation system for maintaining tire inflation on a vehicle, the central tire inflation system comprising:
a conduit forming a fluid flow path to place a vehicle air source in fluid communication with at least one vehicle tire;
a flow sensor in fluid communication with the conduit and the at least one vehicle tire;
a flow sensor unit operably connected to the flow sensor, the flow sensor unit comprising:
a calculator, the calculator to receive at least one flow signal from the flow sensor and calculates a flow rate based on the at least one flow signal, the calculator outputs a flow rate signal;
a comparator, the comparator to receive the calculated flow rate from the calculator and compare the flow rate to a first flow rate threshold, wherein the comparator outputs an alarm signal when the flow rate violates the first flow rate threshold;
a transmitter, the transmitter to emit the flow rate signal and the alarm signal; and
a display, the display viewable by an operator and operably connected to the flow sensor unit, wherein the display receives the emitted flow rate signal and alarm signal and is configured to display the flow rate to alarm when the alarm signal is received, wherein the comparator compares the flow rate to at least a second low rate threshold, wherein the comparator outputs a warning signal when the flow rate violates the second flow rate threshold, wherein the second flow rate threshold is less than the first flow rate threshold.

11. A method of alerting an operator to airflow to at least one of a vehicle, the method comprising:
providing a flow sensor having at least two pressure sensors in an air conduit in fluid communication with at least one tire of the vehicle and a temperature sensor;
measuring pressures at a plurality of locations in the air conduit using the at least two pressure sensors of the flow sensor;
measuring temperature:
transmitting the measured pressures and temperature to a processor;
calculating, at the processor, at least a mass flow rate based on the measured pressures and temperature;
comparing the calculated mass flow rate to at least a first threshold;
generating an alarm signal when the mass flow rate violates the first threshold;
broadcasting the mass flow rate and the alarm signal to a monitor located in the vehicle cab and viewable by the operator;
displaying the mass flow rate on the monitor wherein the operator views the mass flow rate; and
providing an alarm in the vehicle cab when the alarm signal is generated.

12. The method of claim 11 wherein the step of providing a flow sensor provides a plurality of flow sensors such that a single flow sensor is in fluid communication with a single tire of a corresponding plurality of tires, and wherein the step of calculating the mass flow rate comprises calculating a mass flow rate to each of the plurality of tires.

13. The method of claim 12 wherein the step of displaying displays a plurality of mass flow rates and wherein the plurality of mass flow rates comprise the mass flow rate for each of the plurality of tires.

14. The method of claim 11 wherein the step of calculating comprises adjusting the mass flow rate based on pressure.

15. The method of claim 11 further comprising maintaining the vehicle based on the alarm.

16. The method of claim 11 further comprising the step of calculating a duration of flow to the at least one tire and generating an alarm when the duration of flow exceeds a first time threshold.

17. The method of claim 11 further comprising providing a power source.

18. A method of alerting an operator to airflow to at least one of a vehicle, the method comprising:
providing a flow sensor in an air conduit in fluid communication with at least one tire of the vehicle;
measuring pressures at a plurality of locations in the air conduit using the flow sensor;
transmitting the measured pressures to a processor;
calculating, at the processor, at least a mass flow rate based on the measured pressures;
comparing the calculated mass flow rate to at least a first threshold and at least a second threshold;
generating an alarm signal when the mass flow rate violates the first threshold and a warning signal when the mass flow rate violates the second threshold;
broadcasting the mass flow rate, the alarm signal, and the warning signal to a monitor located in the vehicle cab and viewable by the operator;
displaying the mass flow rate on the monitor wherein the operator views the mass flow rate;
providing a warning in the vehicle cab when the warning signal is generated; and
providing an alarm in the vehicle cab when the alarm signal is generated.

* * * * *